United States Patent [19]

Palermo et al.

[11] Patent Number: 5,594,917
[45] Date of Patent: Jan. 14, 1997

[54] HIGH SPEED PROGRAMMABLE LOGIC CONTROLLER

[75] Inventors: Robert J. Palermo; Alan D. McNutt; Daniel F. Moon, all of Johnson City, Tenn.

[73] Assignee: Siemens Energy & Automation, Inc.

[21] Appl. No.: 410,418

[22] Filed: Mar. 27, 1995

Related U.S. Application Data

[63] Continuation of Ser. No. 963,145, Oct. 19, 1992, abandoned.

[51] Int. Cl.$^6$ ........................................... G06F 9/38
[52] U.S. Cl. ................................. 395/800; 395/842
[58] Field of Search .............................. 395/800, 375, 395/775; 364/136

[56] References Cited

U.S. PATENT DOCUMENTS

| | | | |
|---|---|---|---|
| 4,165,534 | 8/1979 | Dummermuth et al. | 395/275 |
| 4,215,399 | 7/1980 | Pavicic et al. | 364/136 |
| 4,912,623 | 3/1990 | Rantala et al. | 364/136 |
| 5,068,821 | 11/1991 | Sexton et al. | 395/800 |
| 5,287,548 | 2/1994 | Flood et al. | 395/375 |
| 5,371,860 | 12/1994 | Mura et al. | 395/842 |
| 5,504,930 | 4/1996 | Kobayashi et al. | 395/800 |

FOREIGN PATENT DOCUMENTS

| | | |
|---|---|---|
| 0120194A3 | 10/1984 | European Pat. Off. . |
| 0174231A1 | 3/1986 | European Pat. Off. . |
| 0455345A2 | 11/1991 | European Pat. Off. . |
| 0476154A1 | 3/1992 | European Pat. Off. . |
| 0473086A1 | 3/1992 | European Pat. Off. . |
| 2028543 | 3/1980 | United Kingdom . |
| 2244828 | 12/1991 | United Kingdom . |

OTHER PUBLICATIONS

–Phillip Robinson, *The Amiga's Custom Graphics Chips*, Nov. 1985, vol. 10, No. 12, BYTE, USA, pp. 169–182.
–Chris Crawford, *The Atari Tutorial Part 1:The Display List*, BYTE, Sep. 1981, vol. 6, No. 9, USA, pp. 284–300.
–Robert Peck et al., Commodore–Amiga Inc. 'Amiga Hardware Reference Manual', Sep. 1989, Addison–Wesley Publishing Co. Inc., pp. 1–32.

*Primary Examiner*—Ayaz R. Sheikh
*Attorney, Agent, or Firm*—Donald M. Boles

[57] ABSTRACT

A high speed programmable logic controller is taught. Briefly stated a Programmable Logic Controller having memory, a microprocessor and a Co-Processor are operatively interconnected using a Harvard style architecture therefore having separate data and instruction busses. The Co-Processor acts as a Boolean Processor and is therefore able to simultaneously perform instruction fetches and executions thereby resulting in substantially increased overall speed of the PLC and therefore allowing for fast process control.

12 Claims, 2 Drawing Sheets

HIGH SPEED PROGRAMMABLE LOGIC CONTROLLER

CROSS-REFERENCE TO RELATED APPLICATION

This is a continuation of Ser. No. 07/963,145 filed Oct. 19, 1992, now abandoned.

FIELD OF THE INVENTION

This invention relates, generally, to programmable logic controllers and more particularly to a programmable logic controller using a boolean co-processor to execute hi-speed instructions and operations.

BACKGROUND OF THE INVENTION

Programmable logic controller have been known and used for a number of years. However, they have traditionally been relegated to relatively simple and menial tasks when viewed in terms of the inherent potential inherent of what is basically a computer. Moreover, for cost purposes present day programmable logic controllers do not utilize state of the art microprocessors but generally utilize commonly known and available microprocessors. Accordingly, they are generally multi-purpose devices for fitting into a variety of situations, and which generally function well for their purpose.

As a result of this, existing programmable logic controllers (PLC) generally translate a users program into the native language of the host processor or sometimes interpret the users program directly. Some manufacturers have even incorporated existing microprocessors which have some boolean instructions included in their instruction set. However, the number of data elements that can be used with these types of existing processors is presently very limited.

It has been found that boolean instructions are a excellent way in which one can greatly increase the speed of a processor. Generally boolean processors break-up operations into a series of smaller elements with the thought that separate operations are more quickly implemented.

Given present day manufacturing economics, high-speed accurate machine control must be implemented and maintained in order to more accurately control process parameters. Such implementation is frequently vital to the success of the process operation from a manufacturing and economic viewpoint.

Some PLC users, in an effort to execute PLC instructions more quickly have resorted to several techniques for managing these speed limitations. These techniques include, but are not limited to dividing the PLC task into smaller tasks and programming these tasks into separate programmable logic controllers; using programmable logic controllers that incorporate some method of identifying critical tasks and executing them at a preset rate; or slowing down the control process to meet the requirements of existing machines.

Unfortunately, all these mentioned techniques require unacceptable compromises or inordinate amount of preplanning on the part of the PLC user. Moreover, the speed of the PLC is still generally unacceptable where high-speed processor and instruction requirements are required. By way of example, interpreting a users program limits the execution time of a PLC to 5–10 micro-seconds per boolean instruction. Reducing this time by translating the instruction into the native language of the host processor can only reduce this instruction speed to the 300–500 nanosecond range. Ultimately, existing programmable controller microprocessors with built-in boolean instructions can only achieve approximately 160 nano seconds per boolean instruction.

Accordingly, it is desirable, and an object of the present invention to produce a programmable logic controller which can operate on high-speed instructions.

it is yet another object and advantage of the present invention to produce a programmable logic controller which can produce execution times of less than 40 nanoseconds per instruction.

It is still another object of the present invention and it is advantageous to produce a programmable logic controller having a boolean co-processor which is still operable with the existing standard programmable logic controller microprocessors.

A still further object and advantage of the present invention is a high-speed programmable logic controller which does not require the user to divide up PLC tasks, or utilize additional programmable logic controllers or to identify critical tasks with the thought of separately handling them.

Yet another object of the present invention and advantage thereof is a programmable logic controller which does not require the control process to be slowed down in order to meet the speed and instruction execution requirements of existing programmable logic controllers.

A further object of the present invention and advantage thereof is a programmable logic controller which is relatively inexpensive to manufacture and implement.

Another object of the present invention is to produce a programmable logic controller, comprising a microprocessor operatively connected to a memory device, a boolean co-processor and an image RAM, wherein separate instruction and data buses are utilized, and wherein the boolean co-processor can inquire and fetch instruction separately from the microprocessor. Such a device is taught by the present invention.

BRIEF DESCRIPTION OF THE DRAWINGS

Reference may be now had to be accompanying drawings in which.

DETAILED DESCRIPTION OF THE PREFERRED EMBODIMENT

Preliminary to a detailed description of the present invention, it is believed that an overview of its structure and operation will greatly assist in its understanding. The boolean portion of the present invention is a high speed processor, and in effect is a co-processor. The co-processor (BP) is used to execute simple boolean instructions found in ladder logic programs. It is a stack oriented machine employing a push down stack (PDS) with 16 levels. It has a instruction bus separate from its data bus, commonly referred to and readily known to one skilled in the art as having a Harvard Architecture. This architecture permits simultaneous instruction fetching and instruction execution.

The BP is implemented as a coprocessor and is accessible by the host processor as a peripheral for configuration and start-up purposes. When the BP executes instructions, it acquires the bus from the host processor and fetches its' own instructions. This avoids the overhead of the host processor in both instruction fetching and the format of the instructions. In the preferred embodiment of the present invention, the host or PLC processor is a 68020 type. However, any other suitable host processor can be used without departing from the spirit and scope of the present invention.

The BP is broken up into two parts: a prefetch unit and an execution unit. The prefetch unit is responsible for fetching instructions from the instruction RAM, decoding them and calculating the physical address from the base register and the displacement. The instruction may be executed by the prefetch unit if it does not operate directly on the data. Otherwise it is passed to the execution unit for completion.

The execution unit is responsible for fetching data from the image register and performing the desired operation on the PDS.

OPERATION WITH THE HOST PROCESSOR

The host processor starts the BP by initializing its registers and reading the program counter register. The BP will abort the read cycle to this register, request the bus and begin executing instructions to completion. When the BP completes execution, the host processor will retry the read of the program counter and will obtain the address of the instruction following the last BP instruction executed. The BP's program can be broken up into segments with host processor instructions inserted between the segments. The host processor can restart the BP by simply reading the program counter as described above and the BP will start execution on the next segment.

The location of the next segment is given in the address field of the suspend instruction so the BP knows the where to start executing the next segment after a suspend is executed. By coding the address of the next segment in the suspend instruction, the overhead of loading that address is avoided thus reducing the time it takes to restart the BP.

Figure 2:
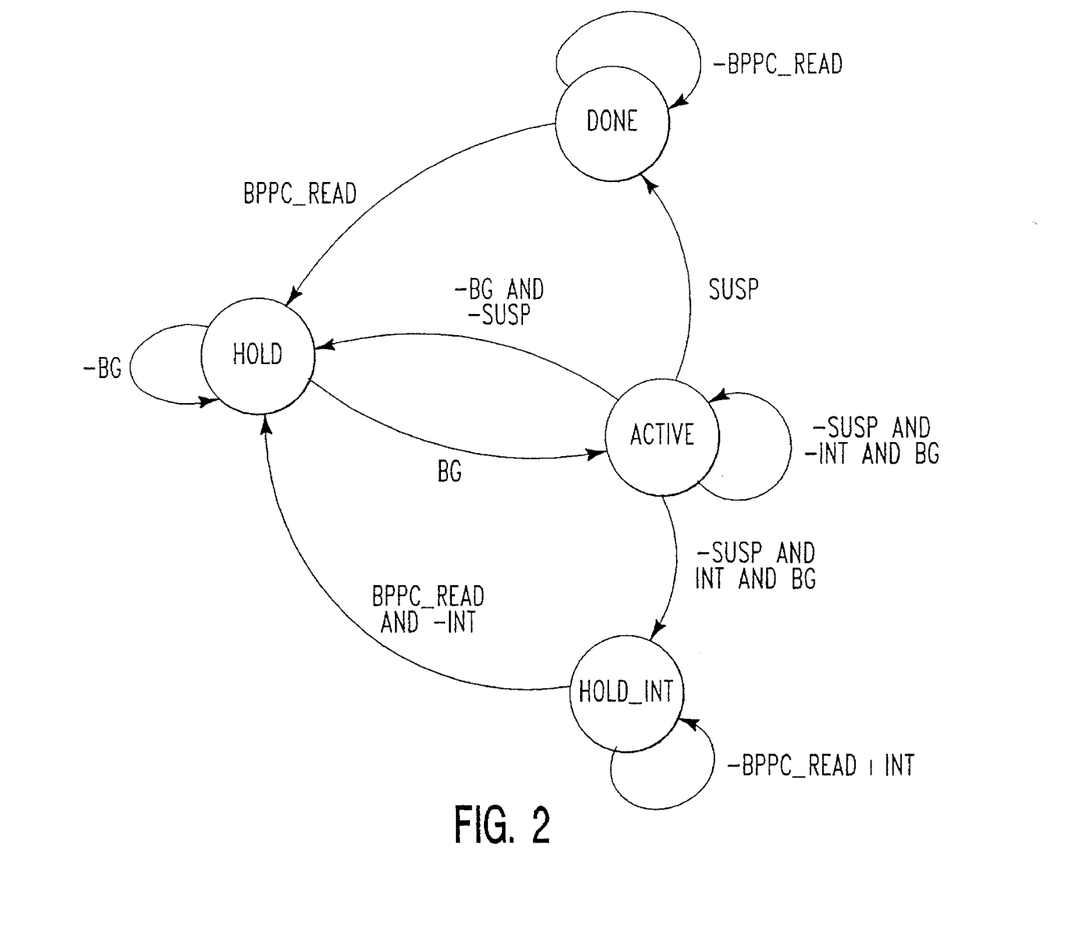
FIG. 2 is a state diagram of the co-processor portion of the present invention.

Referring now to FIG. 2, it can be seen that the boolean processor can be in 1 of four states: done, hold, active and hold_for_interrupt. A reset places the processor in the done state. When a read from the BPPC occurs, the boolean processor will enter the hold state, assert bus request and wait until a bus grant is received from the host processor. The boolean processor will also abort the BPPC read by asserting halt and berr together.

When a bus grant is received, the boolean processor enters the active state and execution is initiated. Execution continues until a terminating condition is encountered. Terminating conditions are as follows:

1. An unconditional SUSP instruction is encountered.
2. A conditional SUSP instruction is encountered and the condition is true.
3. An illegal instruction is encountered.
4. One or more of the interrupt lines going to the host processor are asserted.

If a conditional SUSP instruction is encountered and not taken, the BP will continue execution at the address specified by the SUSP instruction without terminating. This allows inactive box instructions to be skipped by the boolean processor thereby improving the overall performance.

When the BP encounters a terminating condition, it stops fetching instructions and any remaining instructions in the pipeline are executed. The BP will permit the read to complete normally after a terminating condition is encountered. The value fetched on the retry will depend on what condition terminated the boolean processor. If a PDS read is done, idle clock cycles will be inserted until the instruction pipeline is empty. In the preferred embodiment of the present invention, the maximum number of clock cycles that will be inserted is 16.

If a suspend instruction terminated the BP will enter the DONE state. The read of the BPPC will fetch the address of the instruction following the SUSP instruction.

If an illegal instruction is encountered the BP will treat the instruction like a SUSP instruction except the retry read of the BPPC will fetch the BP fault address register. Subsequent reads of the BPPC will fetch the address of the offending instruction without initiating the BP if the reads are done in the context restore/save area.

BP instruction fetch can be put into the hold state temporarily by negating the bus grant. The instruction execution will continue until the internal pipeline is exhausted. When the bus grant line is reasserted, the BP will resume fetching instructions. This allows DMA devices to acquire the bus from the BP during long boolean instruction sequences.

The BP execution can also be held by an interrupt for the main processor. When an interrupt occurs, the BP will release its bus request and enter the hold for interrupt state and remain there until the BPPC is read and the interrupt lines are all negated. The host processor will be allowed to retry the PC read cycle and value fetched will be the contents of the interrupt restart register. This is the address of the code that will restart the BP after the host processor is done servicing all interrupts.

When a read of the BPPC occurs, the boolean processor will enter the hold state, re-assert its bus requests and abort the BPPC read cycle. This will restart the BP at point where the interrupt halted execution. This allows the interruption of the BP for an external interrupt thus reducing the interrupt response time of the main processor.

The BP will permit accesses to the image register while it is not in the active state. This will be accomplished by stopping the execution of instructions in the pipeline until the read or write request is satisfied. Accesses to the image register will not affect the BP operation unless it changes data the BP is referencing.

The boolean instructions are separated into 2 classes, primary and secondary. Primary instructions operate on the push down stack (PDS) and/or the image register. Secondary instruction control the execution flow of the processor, contents of the base registers and other miscellaneous tasks. Primary instructions are converted into an internal format with addresses converted to absolute addresses and mcr/jmp bit status included if the instruction is an output instruction. These instructions are loaded into the instruction queue for execution by the execution unit. Secondary instructions are executed immediately by the prefetch unit. This eliminates the overhead of instructions like those that alter the base registers since primary and secondary instructions are executed simultaneously.

DETAILED OPERATIONAL DESCRIPTION

Figure 1:
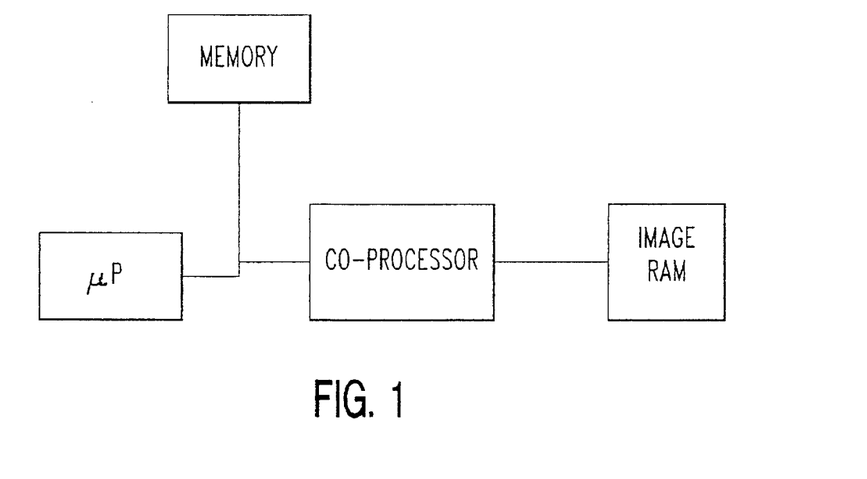
FIG. 1 is a block diagram of the programmable logic controller of the present invention.

Referring now to FIG. 1, a block diagram of the overal Programmable Logic Controller (PLC) is shown. Here there is shown a microprocessor (uP) which is generally the heart of a PLC and as previously indicated is a 68020 type microprocessor. The uP is connected by bus type architecture to memory and the co-processor (BP) of the present invention. The BP is connected by bus type architecture to the Image Ram which is also memory. It is to be understood that the general operation and configuration of PLC's is well known in the art to one skilled in PLC's and therefore will only be minimally discussed, while the workings of the BP and its operation with the microprocessor will be discussed in more detail.

As previously indicated, the boolean processor of the present invention uses a Harvard type architecture. This allows for simultaneous instruction fetch and execution. In the preferred embodiment of the present invention, the BP is an Application Specific Integrated Circuit (ASIC) although other types of impementation may be used without departing from the preferred embodiment of the present invention. The instruction address space is an 8 mWord with branch instructions that have a maximum reach of 1 mWord. The image register contains 64K discretes with force stored in the first 16 Kb of the imageRAM. The other 16 Kb of the image RAM contains word force and one shot history bits.

The boolean processor can be stopped at any point during its instruction fetch and restarted without affecting its operation. While it is stopped, a context save operation can be performed by reading the registers in the context save/restore area. A new set of registers may be loaded to allow the continuation of another task that was previously stopped and saved.

Figure 3:
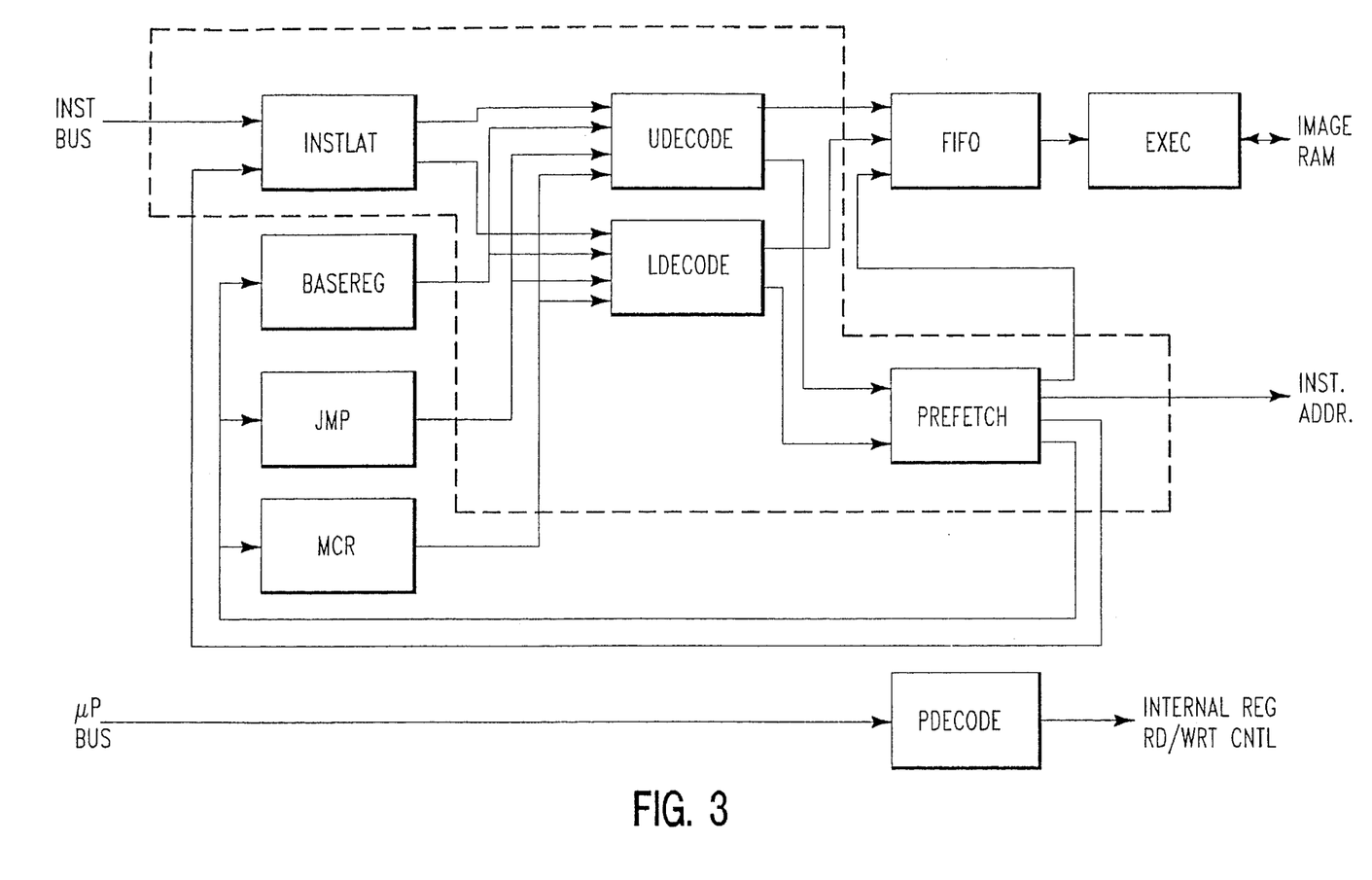
FIG. 3 is a block diagram of the co-processor of the present inventions.

Referring now to FIG. 3, a block diagram of the boolean processor (BP) is shown inside the dotted box while some closely related functions are shown adjacent thereto. The BP is divided up into 3 major units: the prefetch unit, the instruction queue and the execution unit. In addition to these 3 units, there is an additional block, "pdecode", that provides the host processor the capability to program and start the BP.

PREFETCH UNIT

The prefetch unit is the largest portion of logic in the BP. It includes the instlat, udecode, ldecode, basereg, jmp, mcr and prefetch blocks which are shown in FIG. 3.

The prefetch block directs the instruction fetch function of the boolean processor. It initiates read operations from the instruction RAM and loads the instruction queue with instructions to be executed if they are primary instructions. Secondary instructions are executed directly by the prefetch function. The "instlat" latches instructions off of the instruction data bus (which in the preferred embodiment of the present invention is the 68020 data bus). It also detects and manages long word instructions that are split across long word boundaries. It also provides up to 2 instructions to be decoded: one on the bus uuword/ulword and one on the bus lword. The "udecode" and "ldecode" simultaneously decode instructions that are held in "instlat".

All address calculations for image RAM addresses and branch addresses are also performed by the 2 decode blocks. The "basereg" provides the base register data for the decode functions' address calculation. The "jmp" and "mcr" blocks manage the JMP and MCR bits respectively. They assert the all zero signal if all 8 bits in their respective registers are zero.

INSTRUCTION QUEUE

The instruction queue is contained in the block labeled "fifo". It is a 4 deep fifo that is written by the prefetch unit and read by the execution unit. Up to 2 instructions may be read and written simultaneously. The fifo provides empty and full indications for the prefetch and execution units.

EXECUTION UNIT

The execution unit is contained in the block labeled "exec" and is responsible for executing primary instructions that are stored in the "fifo". Transfers to and from the image RAM are also managed by the execution unit.

HOST PROCESSOR TO BP INTERFACE

The "pdecode" provides the processor decode functions that allow the 68020 to access the internal registers of the boolean processor. Also provided is the capability for the host processor to read and manipulate the image register directly. This allows the host processor to initialize the image register after power has been restored to the RAM.

DATA AND REGISTER DESCRIPTIONS DATA ORGANIZATION

Instructions and data are organized around 16 bit and 1 bit entities. The 16 bit values have the same format as that for the 68020 1 bit values and are mostly used in the Image Register and can be combined into arrays of any size.

IMAGE REGISTER

The Image Register is a pair of single bit arrays containing 65536 entries. Each entry contains a data bit and a force bit. The one shot history is an array of bits containing 65536 entries. There are no force bits associated with one shot history.

PUSH DOWN STACK (PDS)

The Push Down Stack is used as both destination and source for all primary instructions. It is a 16 bit word with the most significant bit designated as the stack top. Because of the bit numbering scheme used, the bit number for the stack top is 15.

MCR AND JMP REGISTER

The MCR and JMP registers are an array of 8 bits whose elements can be set and cleared via 4 boolean processor instructions. These registers hold information for the JMP and MCR instructions used in ladder logic programs.

PROGRAM COUNTER

The boolean processor uses 2 program counters: one contains the address of the instruction currently being decoded (BPPC) and the other contains the address of the instruction currently being fetched from the instruction memory (NBPPC). The BPPC is accessed whenever the boolean processor is started by the host processor. Writing the BPPC also updates the NBPPC. The NBPPC is also updated whenever a skip instruction is taken or a suspend instruction is encountered and not taken. In this case, the NBPPC will be updated to the absolute address calculated from the address field of the skip or suspend instruction. Both registers can be used as source addresses in calculating absolute addresses from the PC relative displacements found in skip and suspend instructions. The choice of register depends on the alignment and length of the instruction.

BASE REGISTERS

The boolean processor uses base displacement addressing for all accesses to the Image Register. There are three 16 bit base registers number 0–2.

INSTRUCTION DESCRIPTIONS AND/AND_N

The AND instructions read a bit from the Image Register, "ands" it with the top of the stack and places the result back on the top of the stack. The AND_N instruction performs the same operation except the value read from the Image Register is complemented before it is used. The address of the Image Register bit is the sum of the 11 bit signed displacement and the selected page register.

The result is also conditioned by the STEPEN bit. If the STEPEN bit is 0, then the result of the operation is forced to zero.

OR/OR_N

The OR instructions read a bit from the Image Register, "ors" it with the top of the stack and places the result back on the top of the stack. The OR_N instruction performs the same operation except the value read from the Image Register is complemented before it is used. The address of the Image Register bit is the sum of the 11 bit signed displacement and the selected base register. The result is also conditioned by the STEPEN bit. If the STEPEN bit is 0, then the result of the operation is forced to zero.

OUT/OUT_N

The OUT instruction transfers the value on the top of the stack to the addressed Image Register bit. The OUT_N instruction transfers the complement of the value on the top of the stack. The contents of the stack are not affected. This instruction is conditioned by the MCR, JMP and FORCE bits. If any of the JMP bits are set then the OUT and OUT N instruction will result in a nop but will require the same number of clock cycles to execute as a normal OUT. If any of the MCR bits are set then the OUT and OUT_N instruction will transfer a 0 to the Image Register. This has precedence over the JMP bits. Should the FORCE bit for the addressed bit be set then the transfer will be inhibited. This also has precedence over both the JMP and MCR bits. The address of the Image Register bit is the sum of the 11 bit signed displacement and the selected base register.

STR/STR_N

The STR instruction pushes the address Image Register bit onto the top of the stack. The value on the bottom of the stack is discarded. The STR_N instruction performs the same operation except the value read from the Image Register is complemented before it is used. The address of the Image Register bit is the sum of the 11 bit signed displacement and the selected base register. The result is also conditioned by the STEPEN bit. If the STEPEN bit is 0, then the result of the operation is forced to zero.

SUSP

The SUSP instruction causes the boolean processor to stop fetching instructions or continue fetching at the target address of the instruction. The SUSP instruction always stops the BP. The SUSP_T instruction stops the BP if the top of the stack is 1 and the SUSP_F instruction stops the BP if the top of the stack is 0. If the SUSP_T or the SUSP_F does not stop the BP, then execution will continue at the address derived by adding the 8 bit signed displacement to the address of the instruction following the SUSP instruction. If the BP is terminated, the BPPC will be set to the address of the instruction following the SUSP for the first read after termination. Subsequent reads of the BPPC will fetch the target address of the SUSP instructions.

OS

The OS instruction implements the ladder logic one shot function. It is intended to provide an output of 1 whenever the input transitions from a 0 to a 1. This is implemented using a history bit stored in the Image RAM. Whenever the history is a 0 and the current top of the stack is 1, the top of the stack is set to 1 while otherwise it is set to zero. The history bit is always set to the current top of the stack.

LDA/LDAL

The LDA/LDAL instruction loads the selected base register with the unsigned operand. The LDA instruction multiplies it's 8 bit operand by 256 to obtain a 16 bit value before loading the selected register. The LDAL instruction transfers it's 16 bit operand directly to the selected register.

SKIPS/SKIPL

The skip instructions alter the address at which the BP fetches instructions. The target address of the skip instruction is relative to the address of the instruction that follows the skip. The SKIPS instructions uses an 8 bit signed displacement and the SKIPL instructions use a 20 bit signed displacement. The SKIPS_T/SKIPL_T will alter program flow if the top of the stack is 1. The SKIPS_F/SKIPL_F will alter program flow if the top of the stack is 0. If the top of the stack does not match the condition specified by the conditional skip, then fetching continues with the instruction following the skip.

CLRL

The CLRL instructions clears the addressed Image Register bit if the top of the stack is 1. This instruction is conditioned by the state of the JMP and MCR bits. Should any JMP bits be set, the instruction becomes a nop. If any MCR bits are set, the instruction executes normally. Preferably, the MCR has precedence over JMP. However, when the force bit is set, then the instruction becomes a nop.

SETL

The SETL instructions sets the addressed Image Register bit if the top of the stack is 1. This instruction is conditioned by the state of the JMP and MCR bits. If any JMP bits are set, the instruction becomes a nop. If any MCR bits are set, the instruction clears the addressed bit like the CLRL instruction above. Again, MCR has precedence over JMP and if the force bit is set the instruction becomes a nop.

AND_STR

The AND_STR instruction performs a logical "and" on the 2 items on the top of the stack, pops 1 item off of the stack and replaces the result on top of the stack. A zero is inserted at the bottom of the stack.

OR_STR

The OR_STR instruction performs a logical "or" on the 2 items on the top of the stack, pops 1 item off of the stack and replaces the result on top of the stack. A zero is inserted at the bottom of the stack.

SET_MCR/CLR_MCR

The SET_MCR and CLR_MCR instructions are used to change the state of the MCR bits. There are 8 MCR bits numbered 0–7. SET_MCR will set the selected MCR bit and CLR_MCR will clear the selected MCR bit.

SET_JMP/CLR_JMP

The SET_JMP and CLR_JMP instructions are used to change the state of the JMP bits. There are 8 JMP bits numbered 0–7. SET JMP will set the selected JMP bit and CLR_JMP will clear the selected JMP bit.

SET_STE/CLR_STE

The SET_STE and CLR_STE instructions are used to change the state of the STE bit. SET_STE will set the STE bit and CLR_STE will clear the STE bit. When the STE bit is cleared, the top of the stack will be cleared.

RESLV/RESLV_N,

The RESLV instruction ands together selected bits on the stack and replaces the top of the bit with the result. The RESLV_N performs the same operation except the result is complemented before it is placed on top of the stack. A 16 bit mask is used to select which bits of the stack are included in the "and" operation. The most significant bit of the mask corresponds to the top of the stack and the least significant bit corresponds to the bottom. If a mask bit is set, then the corresponding stack bit is included in the "and" operation.

LDPDS

The LDPDS instruction transfers the 16 bit operand directly to the PDS. If the STEPEN bit is cleared, then the top of the stack will be forced to 0, The NOP instruction is a 1 word nop, No operation is performed,

LABEL

The LABEL instruction is a 2 word nop that allows a 20 bit data field to be stored with the instruction.

BASIC INSTRUCTION FORMATS

The boolean processor instruction set contains 2 instruction lengths: single word and longword, Longword instructions always begin with a FF in the upper 8 bits of the opcode with the lower 8 bits indicating the operation, The second word contains data, Instructions must be word aligned but do not have to be longword aligned,

SINGLE WORD INSTRUCTION FORMATS

BIT SIGNED DISPLACEMENT

There are nine instructions which use the 11 bit address format, These opcodes are in the range of $0000 . . . $D7FF, The first 5 bits indicate the opcode and base register and the least significant 11 bits are a signed address field. There are 2 variations of this format as selected by the most significant 2 bits of the word. The first variant is shown below. It is selected when at least one of the 2 msb's are zero.

If the 2 msb's are both 1, then the second variant is selected. The description of this format is shown below. This format is used for the one shot instruction and therefor is void of an opcode field.

BIT SIGNED DISPLACEMENT

The 8 bit signed displacement field is used by the CLRL and SETL instructions. These instructions also select one of three base registers. The format of this instruction is shown below.

8 BIT PC RELATIVE

The 8 bit PC relative is used for the short skip instructions and the suspend instructions. It is similar to the 8 bit signed displacement format except there is no base register selection. This format provides for a selection of skip/suspend conditions. It should be noted that for a suspend instruction, if the skip is not taken then the BP will suspend. Therefor, the SKIPS_T and SUSP_F both use the same condition selection code. The format of this instruction is shown below.

```
1111 olcc rrrr
      │  │
      │  │
      │  └── +PC relative field
      │
      └──── +skip/suspend condition:
             00 skip if true
             01 skip if false
             10 skip always/suspend always +op selection:
  0 SKIPS
  1 SUSP
```

8 BIT ABSOLUTE

The 8 bit absolute format is used for the LDA instructions. It is also similar to the 8 bit signed displacement format except the data field does not have a signed bit. This instruction format is used for the short base register load instruction, LDA and is shown below.

```
1101 10rr aaaa aaaa
         │
         └── +absolute data field

+base register:
  00 base reg 0
  01 base reg 1
  10 base reg 2
```

4 BIT OPERAND

This instruction format is used for all instructions that either don't have any operands or have an operand that can fit in 4 bits. If the instruction does not have any operands, then the "dddd" field is set to zero's. The format for this is shown below.

```
1111 1011 oooo dddd
              │
              └── +4 bit operand field

+opcode:
  0000 AND_STR
  0001 OR_STR
  0010 SET_STE
  0011 CLR_STE
  0100 SET_MCR
  0101 CLR_MCR
  0110 SET_JMP
  0111 CLR_JMP
  1000 NOP
```

DOUBLE WORD INSTRUCTION FORMATS

The double word instruction format uses the second word as the operand and the first word as the opcode. The opcode format shown below and is similar to the single word 4 blt operand.

```
1111 oooo dddd
         │
         └── +4 bit 2nd operand field

+opcode:
  0000 LDAL
  0001 RESLV
  0010 RESLV_N
  0011 LDPDS
  0100 SKIPL_T
  0101 SKIPL_F
  0110 SKIPL
  0111 LABEL
```

It should be noted that the SKIPL_T, SKIPL_F, SKIPL and LABEL instructions use the "dddd" field as a 4 bit extension to the second word to form a 20 bit operand field. This 4 bit field is the most significant 4 bits of the operand.

DETAILED MEMORY MAP DESCRIPTIONS

REGISTERS

The boolean processor is accessible as a peripheral when it is not executing instructions. It can be programmed as required by the application. In addition, the image register and other registers may read or written.

MEMORY MAP

The address range will select the Image RAM and the BP internal registers. The address block is broken up into 8 areas as shown below.
address Description 1. discrete image, single bit, jmp, mcr and force active
2. discrete image, packed, jmp, mcr and force active
3. discrete image, single bit, jmp, mcr inactive, force active
4. discrete image, packed, jmp, mcr inactive, force active
5. force bit access, discrete
6. force bit access, word
7. direct access to discrete image RAM, no restrictions (32 Kbytes)
8. boolean processor internal registers The image register occupies all of the memory map except for 770000 thru 77FFFF. This range is used for accessing the internal registers of the BP. The memory map for the internal registers is shown below.

| address | Description | length (bits) |
|---------|-------------|---------------|
| 770000  | PDS         | 16 |
| 770002  | address base register 0 | 16 |
| 770004  | address base register 1 | 16 |
| 770006  | address base register 2 | 16 |
| 770008  | BP Program Counter | 32 |
| 77000C  | next BPPC   | 32 |
| 770010  | BP Status Register | 16 |
| 770012  | MCR register | 8 |
| 770013  | JMP register | 8 |
| 770100  | PDS         | 16 |
| 770102  | address base register 0 | 16 |
| 770104  | address base register 1 | 16 |
| 770106  | address base register 2 | 16 |
| 770108  | BP Program Counter | 32 |
| 77010C  | next BPPC   | 32 |
| 770110  | BP Status Register | 16 |

| address | Description | length (bits) |
|---|---|---|
| 770112 | MCR register | 8 |
| 770113 | JMP register | 8 |
| 770200 | Word Image size Register | 8 |
| 770201 | Word Image Base Register | 8 |
| 770202 | Wait Register | 8 |
| 770203 | Revision Register (R/O) | 8 |
| 770204 | Interrupt restart PC | 32 |
| 770208 | BP Fault Program Counter | 32 |

PROGRAM COUNTERS

The BP has 2 program counters: the current PC and the next PC. The current PC (BPPC) is used to hold the address of the instruction that is currently being decoded by the prefetch unit. The next PC (NBPPC) is the address of the instruction currently being fetched. The BPPC is loaded from the NBPPC whenever an instruction is loaded into the instruction latch. The NBPPC is also incremented by 4 (or by 2 in 16 bit mode) at this point. The NBPPC is normally 4 (or 2 in 16 bit mode) greater than the BPPC except for some special situations. These exceptions include execution of skip instructions suspend instructions or invalid opcodes.

When a skip is taken or a suspend is not taken, the NBPPC is loaded with the target address of the instruction as an absolute address. The BPPC will not be affected until the instruction is fetched.

BPPC VALUE AFTER TERMINATION

The BPPC is updated whenever a termination occurs. A termination can be a invalid opcode, a suspend instruction, or an interrupt. The first read of the BPPC will return a value dependent on the type of termination. The below table shows the value of the BPPC for the first and second read of the register.

|  | 1st Read | 2nd Read |
|---|---|---|
| suspend inst. | updated BPPC | updated BPPC |
| invalid opcode | Fault PC | updated BPPC |
| host interrupt | int restart | int restart |

The Fault PC is the contents of the Fault PC register defined in the memory map. The code at this address should handle the invalid opcode as required by the system needs. The update BPPC is provided for diagnostic purposes and is discussed later in this section. The int restart is the contents of the interrupt restart PC register also defined in the memory map. The code at this address allows the host processor to restart the BP after interrupt processing is done.

The updated BPPC is the address of the instruction following the suspend instruction or the address of the invalid opcode. The value of the BPPC after the suspend or invalid opcode depends on the alignment and the bus size, 16 bit or 32 bit. The below table shows the value of the updated BPPC for 16 bit and 32 bit operation. The previous value of the BPPC is always the address of the longword that contains the suspend instruction or the invalid opcode.

|  | aligned | not aligned |
|---|---|---|
| 32 Bit Bus; | | |
| suspend inst. | BPPC+2 | BPPC+4 |
| invalid opcode | BPPC | BPPC+2 |
| 16 Bit Bus: | | |
| suspend inst. | BPPC+2 | |
| invalid opcode | BPPC | |

The NBPPC contains the address of the instruction currently being fetched except when a suspend occurs. For a suspend instruction, the NBPPC contains the target address of the suspend instruction which is calculated from the displacement field of the suspend instruction.

SAVE/RESTORE DIFFERENCES

The operation of the BPPC and NBPPC differs between the normal register area and the save/restore register area. A read of the BPPC in the normal register area will start the BP except if it is the first read following termination. Reads of the BPPC in the save/restore area never start the BP. Writes to the BPPC in the normal register area also write the NBPPC while writes to the BPPC in the save/restore are do not.

BASE REGISTERS 0-2

There are 3 base registers that are used by the BP during program execution. They may be accessed at the locations shown in MEMORY MAP above. Any write that is at least word wide and word aligned may be performed while others are ignored. This register is not initialized on a reset.

PUSH DOWN STACK (PDS)

The PDS is a word register that can be accessed as a single word or combined with base register 0 in a long word transfer. Byte writes to the PDS perform special functions depending on which bytes are written. Byte writes to most significant byte ($770000) will replace the top of the stack (bit 15 of the PDS) with bit 7 of the byte written. Byte writes to the least significant byte ($770001) will push bit 7 of the byte written onto the top of the PDS. Bit 0 is discarded, bit 1 is shifted to bit 0, etc. Both byte writes ignore the data in bits 0 thru 6 of the byte written. This register is not initialized on a reset.

JMP AND MCR REGISTERS

The JMP and MCR registers are 8 bits each and effect the OUT, OUT_N, SETL and CLRL instructions as well as discrete write operations to some areas of the image register. The host processor can access these registers at the addresses shown in MEMORY MAP above. There are no restrictions on transfer size and alignment for write operations. These registers are not initialized on a reset.

STATUS REGISTER

The status register contains two bytes: a status byte and bits 0–7 of a partially loaded longword instruction.

BIT DESCRIPTIONS

The status register contains information about the BP state and the STE register which is contained in the upper byte of the status register. The format of this byte is shown below.

```
1111 11 Bit Description
5432 1098
xx.. .... State bits for save/restore only
..x. .... STE bit
...x .... =1: illegal opcode encountered
.... x... =1: execution idle
.... .x.. =1: BPPC read will not abort
.... ..x. =1: partial longword instruction loaded
```

The State bits show the state of the prefetch unit at the time the register is read. The STE bit is the stage enable bit and is used to qualify the top of the PDS. The illegal opcode encountered bit is set whenever the BP terminated due to an invalid opcode. The execution idle bit is set whenever the execution unit has completed execution of all instructions in the pipeline. When bit 10 is set, the read of the BPPC will not start the BP and will allow the read of the register to complete normally. Bit 9 is set whenever the first word of a long word instruction has been loaded into the lower word of the instruction latch. This indicates that an additional fetch is require at the next longword to acquire the remainder of the instruction. In this case, the lower byte of the status register contains bits 0–7 of the partially loaded longword instruction.

SAVE/RESTORE DIFFERENCES

Write operations to the status register are different between the save/restore area and the normal area. When the status register is written in the normal area, the state bits are not modified. This allows the STE bit to be modified without affecting the state of the BP. When a write is done in the save/restore area, only the MSB of the status bits can be written. This allows the BP to be put into the DONE state (MSB=0) or the HOLD_FOR_INTERRUPT state (MSB=1).

WAIT REGISTER

The wait register sets the number of wait states for instruction fetch and image RAM accesses. It also contains the word image enable bit as well as a special test mode setting. The format for the wait register is shown below.

```
7654 3210 Bit Description
xxx. .... number of clocks-1 for inst. fetch
...x .... number of clocks-1 for image RAM reads/writes
.... .x.. don't care, no effect, can set and clear
.... ..x. word image enable
.... ...x -1: outputs pds(15:8) on devd when chip is test mode
```

Bits 5–7 set the number of wait states for instruction fetch. Bits 3–4 set the number of wait states for image RAM read and write cycles. Bit 1 enables the word image register when set to 1. Bit 0 allows the upper 8 bits of the PDS to be outputed on the DEVD bus. This function is used for production testing of a standalone chip and is enabled only when the chip is in the test mode. This register is initialized to $40 when a reset is applied to the processor. This sets up the processor for 3 clock instruction fetch, 1 clock image read and write and word image disabled.

WORD IMAGE BASE AND SIZE REGISTERS

Two registers are provided to physically locate the word data in main memory and set the length of word image. The Word Image Size register (WISR) selects the word image size. The register values are shown in the table below.

| WISR contents | Word Image Size (in words) |
|---|---|
| 00 | 128 |
| 01 | 256 |
| 03 | 512 |
| 07 | 1k |
| 0F | 2k |
| 1F | 4k |
| 3F | 8k |
| 7F | 16k |
| FF | 32k |

The Word data base register sets the starting address of the word data in main memory. It selects the 64k byte page that the word image resides. The address for the image RAM is derived from the processor address and the two registers described above.

HOST PROCESSOR IMAGE ACCESS

The image register made up of the discrete image and the word image. The image register also manages the force bit information for both discrete and word images. The force bits and the discrete data is stored in a 32K×8 memory called the Image RAM. It is controlled by the boolean processor logic and therefor accessible only through the BP. The word data is stored in the system memory and the state of the force but conditions the write pulses during word image writes. All force bit and discrete image areas are mapped as 8 bit devices to the host processor. Word image areas are mapped as 32 bit devices.

DISCRETE IMAGE REGISTER

The discrete image register is mapped four times to allow a variety of hardware support for the functions commonly encountered in the PLC environment. Discrete data can be accessed in single bit format or packed format. This can be done with the JMP/MCR in effect or not in effect. Single bit data is returned in all bits of the byte for a reads and is taken from bit 0 of the byte for writes. Packed accesses return 8 bits of discrete data with the data for the first address appearing in the LSB of the byte. They may be started at any discrete register address and Will finish at the start address+ 7. If a pack cycle extends past the end of the pack area, writes will be inhibited and reads will return 0.

Writes to $700000 thru $71FFFF will be conditioned by the state of the MCR and JMP bits. If any MCR bits are set, then writes to this area will be treated as clears. If any JMP bits are set and all MCR bits are cleared, then writes will be ignored. Note writes to any bits that have their corresponding force bits set will be ignored. Writes to $720000 thru $73FFFF are not conditioned by the JMP and MCR bits.

Force bits for discretes are stored in $740000 thru $74FFFF. If the force bit is set, then all writes in the discrete area are ignored. The displacement of discrete data bit in the discrete data area and displacement of the corresponding force bit are the same. For example the force bit for the discrete bit at $710023 is located at $740023.

WORD IMAGE REGISTER

The word image register is controlled by the BP even though its' data is stored elsewhere in the system. The only hardware support for the word image is the force function. The force bits stored in $750000 thru $75FFFF determine condition word writes in a manner similar to the discrete force bits. The force bit is in effect for byte writes, word writes and longword writes that affect any or all of the corresponding word point. The displacement of word data bit from the start of the word data area and displacement of the corresponding force bit are the same with the least significant bit of the address ignored. Note the force bits located at odd addresses are not used and the force bit at the even addresses apply to both the even and odd byte of the word point. For example the force bit for the word point located at $C00742 is located at $750742 and the force bit for the word point located at $C003A9 is located at $7503A8.

DIRECT ACCESSES

Direct accesses to the image RAM are permitted in the address range of $760000 thru $76FFFF. Note that with a 32K×8 RAM, the image RAM will be mapped twice in the above mentioned range: at $760000 and at $768000. Direct area accesses are unconditional and therefor can be used to initialized an unknown image RAM. The first 16 Kbytes are used for storage of the discrete image and the corresponding force bits.

The displacement into the direct area for any point is equal to the displacement into the area $700000, $710000, $720000, $730000 or $740000 divided by 4. For example, the discrete point at $720A32 is can be found in bit 2 of the byte located at $76028C. The corresponding force bit is in bit 6 of the same byte.

The other half of the image RAM is reserved for one-shot history and word force bits. One-shot history occupies the least significant nibble of the byte and word force bits occupy the most significant nibble. The only host processor access to one shot history is through the direct area.

For example, the one-shot history bit located at $65A3 (as viewed by the BP program) is found in bit 3 of the byte located at $764000+$1968 or $765968. It is assumed that the WDBR is set to 'C0'.

DETAILED HARDWARE DESCRIPTION

This section describes the operation of the circuits of the Boolean Processor in detail. The discussion is broken up into three sections: Instruction Prefetch, Instruction Execution and Other circuits.

INSTRUCTION PREFETCH

The prefetch circuitry fetches instructions off of the host processor bus, decodes them and executes them if they are secondary instructions or passes them to the execution unit if they are primary instructions. The prefetch unit must be able to perform the following:

1. Fetch instructions from either a longword or word wide bus.
2. Handle word and longword instructions on any word alignment.
3. Provide a programmable wait state generator to allow for the use of slower memories.
4. Decode 2 instructions simultaneously if fetching from a longword wide bus
5. Calculate absolute address from the base register and displacement fields of the primary instructions.
6. Calculate absolute address for the skip instruction from the displacement field and the current program counter value.
7. Execute secondary instructions and manage base, JMP and MCR registers.
8. Pass two instructions to the fifo at the same time.

INSTRUCTION LATCH OUTPUTS

The instruction latch outputs two instruction busses with validity indicators. They are labeled upper and lower corresponding to the upper half and lower half of the long word. The upper bus validity indicator is labeled UVOP. It indicates a valid instruction on the upper bus whenever it is set. The instruction bus is labeled UUWORD and ULWORD. These 16 bit bus are concatenated together to form a bus capable of handling a longword instruction. ULWORD is ignored for word instructions.

The lower bus validity indicator is labeled LVOP. It has the same function as UVOP. The lower instruction bus is labeled LWORD. This 16 bit bus contains the instruction from the lower half of the fetched longword. Longword instructions cannot be decoded off of the lower instruction bus although the first 16 bits of the longword instruction will appear on the bus if the instruction is not longword aligned. The chart below shows a sample instruction stream and the outputs of the instruction latch. The shaded area of the busses are values that are outputed but not used because of the instruction stream.

The 'INST B' on ULNORD is not used because 'INST A' is a 1 word instruction and 'INST B' is outputed on the LWORD bus. The 'INST C' on LWORD is not used since it is a longword instruction and is outputted on UUWORD and ULWORD. Note for a longword aligned longword instruction, it is the only instruction that can be decoded. The 'INST E' on ULWORD is not used since 'INST D' is a single word instruction. The 'INST E' on LWORD just below it is not used since the other half of the instruction has not been fetched. On the next clock edge, the partial instruction on LWORD is moved to UUWORD, the upper half of the data bus is clocked into ULWORD and the lower half of the data bus is clocked into LWORD. Therefor, 'INST E' is outputted in UUWORD and ULWORD as a longword instruction and 'INST F' is outputted on LWORD as a single word instruction.

Sample Instruction Stream

In addition to the instruction busses, there are several other outputs. CONTPEND indicates that a partial longword instruction has been loaded. ALGNLW is asserted whenever a longword instruction, on UUWORD and ULWORD, is aligned on a longword boundary. This is used for address calculations on skip instructions. UOPFX is asserted whenever the upper 4 bits of UUWORD are all one's. This signal is a buffered output of flipflop instead of the logical AND of the 4 MSB's of UUWORD. This reduces the propagation delay of this signal by 2–3 nS.

UOPXF is asserted whenever bits 8–11 are all one's. UOPXB is asserted whenever bits 8–11 are equal to a hex 'B'. Both UOPXF and UOPXB are derived from a flip-flop who's output is asserted whenever bits 8,9 and 11 of UUWORD are asserted. A NA220 and IV140 are used to AND the output of the flip-flop with bit 10 of UUWORD to form these two signals. Although it is not as fast as UOPFX, it is still faster than using a four input NAND followed by an IV140.

UVOP is split into two signals called UVOPA and UVOPB. This is done to split up the loads and reduce the delay of this signal.

INSTRUCTION LATCH INPUTS

In addition to the instruction bus, IDIN, the instruction latch logic accepts several other inputs from other blocks in the BP. Most of these signals originate from the prefetch control logic.

The CLKZ is the clock whose falling edge is used to clock all flip-flops in INSTLAT. It is split into 3 buffered circuits in order to keep the loading to a minimum. RESET is the active high system reset that is used to clear the flip-flop involved in steering the instruction latch logic.

PWSRBPSR is used to load the instruction latch with a partial instruction. This is used to restore context in a multitasking environment.

SUSP originates from the PREFETCH block and indicates that the BP will suspend execution on the next rising system clock edge. LATCHOP also originates from PREFETCH and instructs the instruction latch to load the instruction(s) on IDIN. PCWRT is asserted whenever the prefetch unit alters the normal instruction flow due to a skip instruction or a suspend instruction. The program counter will be loaded on the next clock edge. PCWRTDN indicates that the write to the program counter has been completed and instruction fetch will occur at the new address.

INSTA(1) is bit 1 of the instruction address. When it is set, it indicates that the current instruction fetch is valid only for the lower word of the instruction bus, IDIN.

IN16BIT is used to indicate that the current instruction fetch is on a 16 bit bus. This signal may change as the BP executes a segment of code.

INSTRUCTION LATCH OPERATION

After a reset, the UVOP, LVOP and CONTPEND signals are all negated. Internally, INSTVLD and CNTFLG are also cleared. INSTVLD is set whenever the instruction latch contains at least one valid instruction. CNTFLG indicates that a longword instruction that was partially fetched has be completely fetch on the last fetch.

The instruction latch remains in this state until LATCHOP is asserted by the prefetch control logic. When latchop is asserted, INSTVLD is asserted on the next clock edge. If the instruction address is a longword address INST(1) will be 0 and UVOP will be asserted. Otherwise, UVOP will remain negated. Note that since the BP fetches on longword boundaries on subsequent fetches, UVOP will be asserted the next time LATCHOP is asserted. The instruction on IDIN will be loaded into the instruction latch. IDIN will be loaded into UUWORD since LINSTPDU is active. IDIN will be loaded into ULWORD by LINSTPDL. IDIN is also loaded into LWORD by LINSTLW.

At this point CONTPEND may be asserted if the following conditions are true:

1. The instruction in UUWORD/ULWORD is a single word instruction or the last instruction fetch was not on a longword boundary (UVOP would be negated).
2. LWORD contains part of a longword instruction indicated by LWORD(8:15)=FF.

If CONTPEND is asserted, LVOP will not be asserted since LWORD contains part of an instruction. Otherwise if the instruction loaded is not a longword aligned 2 word instruction, then LVOP will be asserted.

The next instruction fetch will done on a longword boundary and therefor UVOP will be asserted if it is not already asserted. LATCHOP will be asserted and on the next clock edge the next instruction on IDIN will be loaded into the instruction latch. The loading of the instruction latch will depend on the state of the CONTPEND signal. If CONTPEND is negated, then the next instruction(s) on IDIN are loaded the same as the previous case.

If CONTPEND is asserted, then the partial instruction in LWORD must be combined with the upper word on IDIN to form the complete 2 word instruction. The lower word on IDIN will be the instruction loaded into LWORD. When CONTPEND and LATCHOP are asserted, LINSTPD will be asserted and the contents of LWORD are transferred to UUWORD. Also, IDIN is loaded into ULWORD.

CONTPIND may be asserted again if the instruction in LWORD is part of a 2 word instruction. When CNTFLG is asserted, indicating that a unaligned 2 word instruction is outputted on UUWORD and ULWORD, CONTPEND may be asserted if LWORD is an FF. In this case LVOP is negated. Otherwise CONTPEND is negated and LVOP is asserted.

SUSP indicates the BP will stop fetching instructions on the next clock edge. This causes INSTYLD, UYOP, CNTFLG to all be cleared thus putting the instruction latch logic in the reset state.

The instruction latch may be restored after a context switch by writing to the status register in the save/restore area. When this occurs, PWSRBPSR will be asserted. If IDIN(25) is set, indicating that a partial instruction was fetch after the BP interrupted, then INSTVLD will be set. Otherwise it is cleared. UVOP and CNTFLG are always cleared. The contents of UUWORD and ULWORD are not affected but LWORD is reloaded with the partial instruction. LWORD are set to FF since all 2 word instructions have a FF in the first 8 bits. LWORD are loaded with IDIN which is the second byte of the opcode that was save after the BP was interrupted. After the write has been completed, the instruction latch logic is setup to continue fetching with the rest of the partial instruction.

It is to be understood that many variations of the present invention may be practiced without departing from the spirit and scope of the present invention. Accordingly, it is intended that the within invention not be limited by the preferred embodiment but only the claims appended hereto.

What is claimed is:

1. A high speed programmable logic controller, comprising:

memory means for storing instructions;

image register memory means for storing data;

first processor means for processing ones of said instructions;

boolean processor means for processing others of said instructions, said boolean processor means inquiring and and fetching instructions separately from said first processor means, said boolean processor means executing predetermined boolean instructions; and, an instruction bus and data bus interconnecting said first processor means, said memory means, said boolean processor means and said image register memory means;

said boolean processor means comprising an instruction queue;

a pre-fetch unit for fetching said others of said instructions from said instruction memory means and for a) executing a first set of said others of instructions and b) loading a second set of said others of said instructions in said instruction queue; and an execution unit for executing said second set of said others of said instructions stored in said instruction queue.

2. A high speed programmable logic controller according to claim 1, wherein said pre-fetch unit initiates read operations from said memory means.

3. A high speed programmable logic controller according to claim 1, wherein said pre-fetch unit further comprises means for detecting and managing instructions which are split across word boundaries.

4. A high speed programmable logic controller according to claim 1, wherein said boolean processor means can be stopped at any point during instruction fetch and restarted without affecting its operation.

5. A high speed programmable logic controller according to claim 1, wherein said execution unit includes a plurality of registers which are loadable to allow continuation of a task that was previously stopped and saved.

6. A high speed programmable logic controller according to claim 1, wherein said first processor means including means for starting and initializing said boolean processor means.

7. A high speed programmable logic controller according to claim 1, wherein said boolean processor means is a stack oriented machine employing a push down stack with sixteen levels.

8. A high speed programmable logic controller according to claim 9, wherein said predetermined boolean instructions include AND, AND_N, OR, OR_N, OUT, OUT_N, STR, STR_N, SUSP, OS, LDA, AND LDAL.

9. A high speed programmable logic controller according to claim 9, wherein said predetermined boolean instructions further include SKIPS, SKIPL, CLRL, SETL, AND_STR, OR_STR, SET_MCR, CLR_MCR, SET_JMP, CLR_JMP, SET_STE, CLR_STE, RESLV, RESLV_N, and LDPDS.

10. A high speed programmable logic controller according to claim 8, wherein said boolean processor means in response to said AND instruction reads a bit from said image memory means, "ands" said bit with the top of said push down stack and places the result back on the top of the push down stack.

11. A high speed programmable logic controller according to claim 9, wherein said SKIPS instruction alters the address where said boolean processor means fetches instructions.

12. A high speed programmable logic controller according to claim 8, wherein said OR_STR instruction performs a logical "or" on the two items on the top of said push down stack, pops one item off said push down stack and places the result of the logical "or" on the top of said push down stack.

* * * * *

UNITED STATES PATENT AND TRADEMARK OFFICE
CERTIFICATE OF CORRECTION

PATENT NO. : 5,594,917
DATED : 1/14/97
INVENTOR(S) : Palermo et al.

It is certified that error appears in the above-indentified patent and that said Letters Patent is hereby corrected as shown below:

<u>Claim 8</u>
　　　Line 2: change "9" to read --7--.

<u>Claim 9</u>
　　　Line 2: Change "9" to read --7--.

Signed and Sealed this

Twenty-second Day of April, 1997

*Attest:*

BRUCE LEHMAN

*Commissioner of Patents and Trademarks*

*Attesting Officer*